(12) United States Patent
Hara (10) Patent No.: US 7,778,605 B2
(45) Date of Patent: Aug. 17, 2010

(54) METHOD AND DEVICE FOR REPORTING INFORMATION RELATED TO INTERFERENCE COMPONENTS RECEIVED BY A FIRST TELECOMMUNICATION DEVICE TO A SECOND TELECOMMUNICATION DEVICE

(75) Inventor: Yoshitaka Hara, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 639 days.

(21) Appl. No.: 11/611,549

(22) Filed: Dec. 15, 2006

(65) Prior Publication Data

US 2007/0207769 A1 Sep. 6, 2007

(30) Foreign Application Priority Data

Dec. 27, 2005 (EP) ................... 05292816

(51) Int. Cl.
*H04B 1/00* (2006.01)
(52) U.S. Cl. ................ 455/63.1; 455/114.2; 455/278.1; 455/296; 375/144; 375/148
(58) Field of Classification Search ............... 455/63.1, 455/114.2, 278.1, 296, 501, 67.13, 222; 375/144, 375/148, 346
See application file for complete search history.

(56) References Cited

U.S. PATENT DOCUMENTS 6,584,302 B1   6/2003   Hottinen et al.
6,941,123 B2 *  9/2005  Choi et al. .............. 455/273
7,039,363 B1 *  5/2006  Kasapi et al. ........... 455/67.11
7,362,830 B2 *  4/2008  Chul ...................... 375/347
7,457,590 B2 * 11/2008  Frank ..................... 455/69
2003/0125091 A1 * 7/2003 Choi et al. .............. 455/562
2004/0228420 A1 * 11/2004 Chul ...................... 375/267
2005/0136841 A1 *  6/2005 Frank ..................... 455/65
2007/0157279 A1 *  7/2007 Hara et al. .............. 725/124
2008/0039146 A1 *  2/2008 Jin ....................... 455/562.1

FOREIGN PATENT DOCUMENTS

EP    1 521 383 A1    4/2005
WO    WO 03/001761 A1  1/2003
WO    WO 2004/038985 A2 5/2004

OTHER PUBLICATIONS

U.S. Appl. No. 11/611,598, filed Dec. 15, 2006, Hara et al.
U.S. Appl. No. 11/611,549, filed Dec. 15, 2006, Patent App. Publication No. 2007/0207769, Hara.

(Continued)

*Primary Examiner*—Minh D Dao
(74) *Attorney, Agent, or Firm*—Oblon, Spivak, McClelland, Maier & Neustadt, L.L.P.

(57) ABSTRACT

A method for reporting, through a wireless network, information related to interference components received by a first telecommunication device which has M antennas to a second telecommunication device which has N antennas, the method comprises the steps executed by the first telecommunication device of: measuring the interference components received by the first telecommunication device, determining at most M weighting vectors from the measured interference components, weighting at most M pilot signals with the at most M determined weighting vectors, and transferring the at most M weighted pilot signals to the second telecommunication device.

18 Claims, 4 Drawing Sheets

OTHER PUBLICATIONS

U.S. Appl. No. 11/767,186, filed Jun. 22, 2007, Patent App. Publication No. 2009/0010148, Hara.

Shahab Sanayei, et al., "On the Design of Linear Precoders for Orthogonal Space-Time Block Codes with Limited Feedback", Wireless Communications and Networking Conference, XP-010791212, Mar. 13, 2005, pp. 489-493.

Tarkesh Pande, et al., "A Weighted Least Squares Approach to Precoding with Pilots for MIMO-OFDM", IEEE Transactions on Signal Processing IEEE, vol. 54, No. 10, XP-002409775, Oct. 1, 2006, pp. 4067-4073.

* cited by examiner

METHOD AND DEVICE FOR REPORTING INFORMATION RELATED TO INTERFERENCE COMPONENTS RECEIVED BY A FIRST TELECOMMUNICATION DEVICE TO A SECOND TELECOMMUNICATION DEVICE

The present invention relates generally to telecommunication systems and in particular, to methods and devices for reporting information related to interference components received by a telecommunication device to another telecommunication device.

Recently, efficient transmission schemes in space and frequency domains have been investigated to meet the growing demand for high data rate wireless telecommunications. In the space domain, Multi-Input Multi-Output (MIMO) systems using multiple antennas at both transmitter and receiver sides have gained attention to exploit the potential increase of the spectral efficiency.

The transmission schemes using MIMO systems have been mainly studied from two different approaches. The first approach is related to the case where the telecommunication device transfers simultaneously parallel data streams using an antenna for each of the data streams without having any knowledge about the channel conditions which exist between itself and the telecommunication devices to which the data streams are transferred.

The second approach is that the telecommunication device which transmits data streams has some knowledge of the channel conditions which exist between itself and the telecommunication devices to which the data streams are transferred. The telecommunication device directs the signals transferred to a telecommunication device according to the channel conditions, and then improves the overall performances of the system.

Practically, when the channels responses between uplink and downlink channels are reciprocal, e.g. in Time Division Multiplex systems, the channel conditions are obtained according to the following method: a first telecommunication device transfers pilot signals to a second telecommunication device, the second telecommunication device receives the pilot signals, determines the channel responses from the received pilot signals, as example under the form of a channel matrix which is representative of the channel conditions, and uses the determined matrix in order to direct the signals which have to be transferred to the first telecommunication device which has sent the pilot signals.

The coefficients of the determined channel matrix are the complex propagation gain between the antennas of the second telecommunication device and the antennas of the first telecommunication device.

Such determination of the channel conditions is effective when the first telecommunication device receives only spatially white noise signals in parallel with the transferred signals by the second telecommunication device.

Spatially white noise means that the noise received by each antenna of the first telecommunication device have no correlation and have an equal power.

If the first telecommunication device receives spatially coloured interference components, the second telecommunication device is not aware about these interference components and the second telecommunication device may direct the signals transferred to the first telecommunication device in a wrong direction. As example, the signals received by the first telecommunication device and transferred by the second telecommunication device may have the same direction of the interference components.

Spatially coloured noise means that the noise received by each antenna of the first telecommunication device are correlated and or have different power.

If the first telecommunication device is able to measure and report the interference components it receives to the second telecommunication device, it is possible to avoid the above mentioned problem.

Up to now, it is rather impossible for a telecommunication device to report the measured interference components it receives to another telecommunication device without decreasing in an important manner the bandwidth which is used for classical data transmission.

The aim of the invention is therefore to propose methods and devices which allow the reporting of information related to interference components received by a telecommunication device to another telecommunication device without decreasing in an important manner the bandwidth of the uplink channel which is used for classical data transmission.

To that end, the present invention concerns a method for reporting, through a wireless network, information related to interference components received by a first telecommunication device which comprises M antennas to a second telecommunication device which comprises N antennas, characterised in that the method comprises the steps executed by the first telecommunication device of:
  measuring the interference components received by the first telecommunication device,
  determining at most M weighting vectors from the measured interference components,
  weighting at most M pilot signals with the at most M determined weighting vectors,
  transferring the at most Ml weighted pilot signals to the second telecommunication device.

The present invention concerns also a device for reporting, through a wireless network, information related to interference components received by a first telecommunication device which comprises M antennas to a second telecommunication device which comprises N antennas, characterised in that the device for reporting information related to interference components is included in the first telecommunication device and comprises:
  means for measuring the interference components received by the first telecommunication device,
  means for determining at most M weighting vectors from the measured interference components,
  means for weighting at most M pilot signals with the at most M determined weighting vectors,
  means for transferring the at most M weighted pilot signals to the second telecommunication device.

Thus, the first telecommunication device can report the information related to the interference components it receives to a second telecommunication device without decreasing in an important manner the bandwidth which is used for classical data transmission.

According to a first advantageous embodiment, the first telecommunication device determines at least two matrices from the measured interference components, a first matrix being representative of the spatial direction of the interference components and a second matrix being representative of the power of the noise components and the at most M weighting vectors are determined from the first and second matrices.

Thus, the first telecommunication device doesn't need any information, like some pilot signals transferred by the second telecommunication device, in order to determine the at most M weighting vectors.

According to another advantageous embodiment, the first and second matrices are determined by executing an eigenvalue decomposition of an interference correlation matrix $R_{IN}$ obtained from the measured interferences components.

Thus, the determination of the at most M weighting vectors is simple to execute and reflects precisely the interferences components received by the first telecommunication device.

According to another advantageous embodiment, M weighting vectors $g_1$ to $g_M$ are determined according to the following formula:
$G=[g_1, \ldots, g_M]=F^*\Phi^{-1/2}$ where x* denotes the conjugate of x, F is the first matrix and $\Phi$ is the second matrix.

According to another advantageous embodiment, the first telecommunication device determines a power coefficient, weights the at most M pilot signals by the determined power coefficient and transfers to the second telecommunication device signals representing a power information which is related to the determined power coefficient.

Thus, if the first telecommunication device adjusts its transmission power, the second telecommunication device is aware about that power adjustment.

According to still another aspect, the present invention concerns a method for controlling the transfer of signals representative of a group of data to a first telecommunication device by a second telecommunication device through a wireless network, the second telecommunication device having N antennas, the first telecommunication device having M antennas, characterised that in the method comprises the steps executed by the second telecommunication device of:
receiving at most M pilot signals from the first telecommunication device,
determining, from the at most M received pilot signals, information representative of interference components received by the first telecommunication device,
controlling the transfer of the signals representative of the group of data to the first telecommunication device according to the determined information representative of interference components received by the first telecommunication device.

The present invention concerns also a device for controlling the transfer of signals representative of a group of data to a first telecommunication device by a second telecommunication device through a wireless network, the second telecommunication device having N antennas, the first telecommunication device having M antennas, characterised in that the device for controlling the transfer of signals is included in the second telecommunication device and comprises:
means for receiving at most M pilot signals from the first telecommunication device,
means for determining, from the at most MV received pilot signals, information representative of interference components received by the first telecommunication device,
means for controlling the transfer of the signals representative of the group of data to the first telecommunication device according to the determined information representative of interference components received by the first telecommunication device.

Thus, the second telecommunication device is informed about the interference components received by the first telecommunication device without decreasing in an important manner the bandwidth which is used for classical data transmission, is able to control the transfer of signals to the first telecommunication device in order to reduce the effect of the interference components on the transferred signals representative of a group of data.

According to another advantageous embodiment, the determined information representative of interference components received by a first telecommunication device is a weighting vector and the control of the transfer of signals representative of a group of data to the first telecommunication device is made by weighting the signals representative of a group of data transferred to the first telecommunication device by the weighting vector.

Thus, the second telecommunication device can direct the signals transferred to the first telecommunication device according to the information related to interference components received by the first telecommunication device.

According to another advantageous embodiment, the weighting vector is determined by:
calculating a matrix J from the at most M received pilot signals,
executing an eigenvalue decomposition of the product of two matrices obtained from the calculated matrix in order to obtain eigenvectors and eigenvalues,
selecting the eigenvector corresponding to the largest eigenvalue of the product of the two matrices obtained from the calculated matrix.

Thus, the determination of the weighting vector is simple.

According to another advantageous embodiment, the product of two matrices obtained from the calculated matrix is equal to $J^*J^T$, where J* denotes the conjugate of J and $J^T$ denotes the transpose of J.

According to another advantageous embodiment, at least two groups of data are transferred simultaneously to the first telecommunication device and an eigenvector is selected for each group of data transferred simultaneously, the selected eigenvectors corresponding to the at least two largest eigenvalues of the product of the two matrices obtained from the calculated matrix.

Thus, the second telecommunication device can direct the signals representative of each group of data transferred to the first telecommunication device according to the information related to interference components received by the first telecommunication device in order to reduce the effect of the interference components on the transferred signals representative of a group of data.

According to another advantageous embodiment, the second telecommunication receives from the first telecommunication device signals representing a power information and the information representative of interference components received by the first telecommunication device is determined from the at most M received pilot signals and the power information.

Thus, if the first telecommunication device adjusts its transmission power, the second telecommunication device is aware about that adjustment.

According to another advantageous embodiment, the control of the transfer of signals representative of a group of data to the first telecommunication device is the determination of the transmission power to be used for transferring at least a group of data to the first telecommunication device.

Thus the second telecommunication device can reduce the effect of the interference components received by the first telecommunication device.

According to another advantageous embodiment, the control of the transfer of signals representative of a group of data to the first telecommunication device is the determination of the modulation and coding scheme to be used for transferring at least signals representative of a group of data to the first telecommunication device.

Thus, the transfer of signals representing groups of information between the first and the second telecommunication devices is made according to information related to interference components received by the first telecommunication device.

According to another advantageous embodiment, plural first telecommunication devices transfer pilot signals and signals representative of the power information and the control of the transfer of signals representative of a group of data to the first telecommunication device is made by determining to which first telecommunication device or devices among the plural first telecommunication devices, signals representing at least a group of data have to be transferred.

Thus, it is possible to allocate the radio resources of the wireless network in an efficient way.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and devices according to the invention, they will not be repeated here.

According to still another aspect, the present invention concerns signals transferred through a wireless network by a first telecommunication device to a second telecommunication device for reporting information related to interference components received by the first telecommunication device which comprises M antennas to the second telecommunication device which comprises N antennas, characterised in that the signals comprise at most M pilot signals which are weighted by at most M weighting vectors determined from measured interference components received by the first telecommunication device.

Since the features and advantages relating to the signals are the same as those set out above related to the methods and devices according to the invention, they will not be repeated here.

Figure 1:
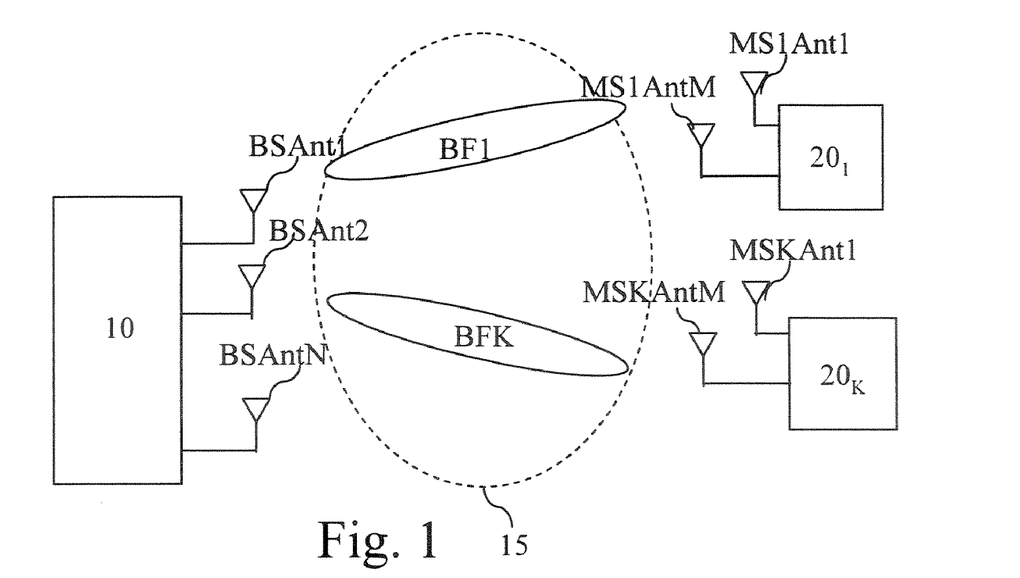
FIG. 1 is a diagram representing the architecture of the system according to the present invention.

The characteristics of the invention will emerge more clearly from a reading of the following description of an example embodiment, the said description being produced with reference to the accompanying drawings, among which:

FIG. 1 is a diagram representing the architecture of the system according to present invention.

In the system of the FIG. 1, at least one and preferably plural first telecommunication devices $20_1$ or $20_K$ are linked through a wireless network 15 to a second telecommunication device 10 using an uplink and a downlink channel.

Preferably, and in a non limitative way, the second telecommunication device 10 is a base station or a node of the wireless network 15. The first telecommunication devices $20_1$ to $20_K$ are terminals like mobile phones or personal computers.

The telecommunication network 15 is a wireless telecommunication system which uses Time Division Duplexing scheme (TDD). The signals transferred in uplink and downlink channels are duplexed in different time periods of the same frequency band. The signals transferred within the wireless network 15 share the same frequency spectrum. The channel responses between the uplink and downlink channels of the telecommunication network 15 are reciprocal.

Reciprocal means that if the downlink channel conditions are represented by a downlink matrix, the uplink channel conditions can be expressed by an uplink matrix which is the transpose of the downlink matrix.

The second telecommunication device 10 transfers simultaneously signals representatives of at most N groups of data to the first telecommunication devices $20_1$ to $20_K$ through the downlink channel and the first telecommunication devices $20_1$ to $20_K$ transfer signals to the second telecommunication device 10 through the uplink channel.

The signals transferred by the first telecommunication devices $20_1$ to $20_K$ are signals representatives of a group of data and/or pilot signals which are weighted by at least a weight determined from the interference components measured by the first telecommunication devices $20_1$ to $20_K$.

A group of data is as example a frame constituted at least by a header field and a payload field which comprises classical data like data related to a phone call, or a video transfer and so on.

Pilot signals are predetermined sequences of symbols known by the telecommunication devices. Pilot signals are as example and in a non limitative way Walsh Hadamard sequences.

The second telecommunication device 10 has at least one antenna and more preferably N antennas noted BSAnt1 to BSAntN. The second telecommunication device 10 preferably controls the spatial direction of the signals transferred to a first telecommunication devices 20 according to at least signals transferred by the first telecommunication devices 20 as it will be disclosed hereinafter.

More precisely, when the second telecommunication device 10 transmits signals representatives of a group of data to a given first telecommunication device $20_k$ through the downlink channel, the signals are N times duplicated and each duplicated signal is weighted. i.e. multiplied by an element of a downlink weighting vector $w_n$ of the second telecommunication device 10. As a result, the second telecommunication device 10 performs beamforming, i.e. controls the spatial direction of the transmitted signals.

The ellipse noted BF1 in the FIG. 1 shows the pattern of the radiated signals by the antennas BSAnt1 to BSAntN which are transferred to the first telecommunication device $20_1$ by the second telecommunication device 10.

The ellipse noted BFK in the FIG. 1 shows the pattern of the radiated signals by the antennas BSAnt1 to BSAntN which are transferred to the first telecommunication device $20_K$ by the second telecommunication device 10.

The first telecommunication devices $20_1$ to $20_K$ have M antennas noted respectively MS1Ant1 to MS1AntM and MSKAnt1 to MSKAntM. It has to be noted here that the number M of antennas may vary according to each first telecommunication device $20_k$ with k=1 to K. Each first telecommunication device $20_1$ to $20_k$ controls the spatial direction of the signals transferred to the second telecommunication device 10 as it will be disclosed hereinafter.

Each first telecommunication device $20_k$ transfers through the antennas MSkAnt1 to MSkAntM, the signals to be transmitted to the second telecommunication device 10. More precisely when the first telecommunication device $20_k$ transmits signals to the second telecommunication device 10 through the uplink channel, the signals are at most M times duplicated and each duplicated signal is weighted, i.e. multiplied, by an element of an uplink weighting vector $g_m$ of the first telecommunication device $20_k$ with m=1 to at most M. As a result, the first telecommunication device $20_k$ performs beamnforming, i.e. controls the spatial direction of the transmitted signals.

The ellipse noted BF1 in the FIG. 1 shows the pattern of the radiated signals by the antennas MS1Ant1 to MS1AntM which are transferred by the first telecommunication device $20_1$ to the second telecommunication device 10.

The ellipse noted BFK in the FIG. 1 shows the pattern of the radiated signals by the antennas MSKAnt1 to MSKAntM which are transferred by the first telecommunication device $20_K$ to the second telecommunication device 10.

Figure 2:
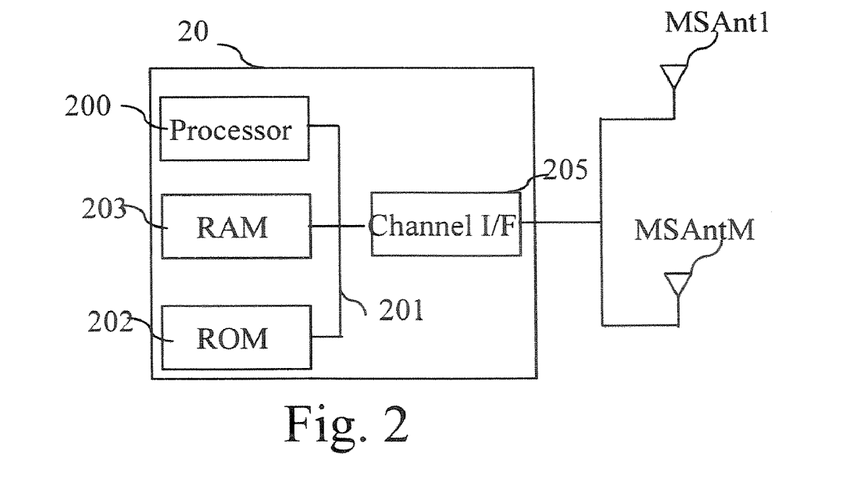
FIG. 2 is a diagram representing the architecture of a first telecommunication device according to the present invention.

FIG. 2 is a diagram representing the architecture of a first telecommunication device according to the present invention.

Figure 6:
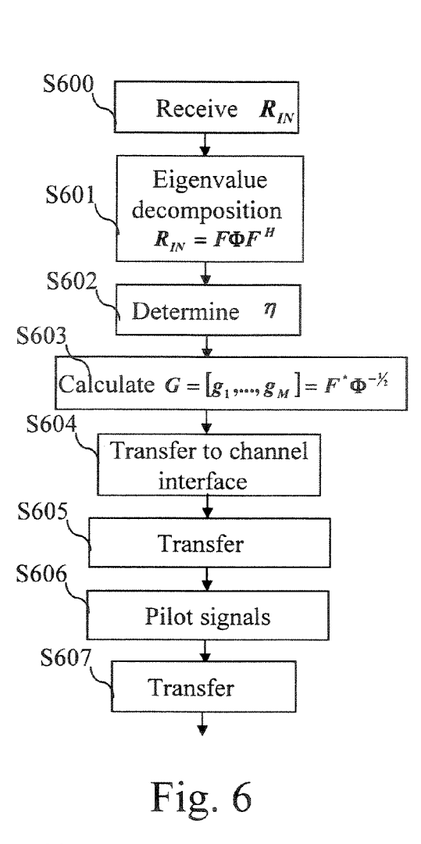
FIG. 6 is an algorithm executed by the first telecommunication device according to the present invention.

The first telecommunication device 20, as example the first telecommunication device $20_k$ with k comprised between 1 and K has, for example, an architecture based on components connected together by a bus 201 and a processor 200 controlled by programs related to the algorithm as disclosed in the FIG. 6.

It has to be noted here that the first telecommunication device 20 is, in a variant, implemented under the form of one or several dedicated integrated circuits which execute the same operations as the one executed by the processor 200 as disclosed hereinafter.

The bus 201 links the processor 200 to a read only memory ROM 202, a random access memory RAM 203 and a channel interface 205.

The read only memory ROM 202 contains instructions of the programs related to the algorithm as disclosed in the FIG. 6 which are transferred, when the first telecommunication device $20_k$ is powered on to the random access memory RAM 203.

The RAM memory 203 contains registers intended to receive variables, and the instructions of the programs related to the algorithm as disclosed in the FIG. 6.

The channel interface 205 comprises means for measuring the interference plus noise components measured by the first telecommunication device $20_k$, means for weighting at most M the pilot signals to be transferred to the second telecommunication device 10 by a power coefficient $\sqrt{\eta}$, means for weighting the weighted pilot signals to be transferred to the second telecommunication device 10 by weighting vectors $g_m$, with m=1 to at most M and means for transferring to the second telecommunication device 10 a power information related to the power coefficient. The channel interface 205 will be described in more detail in reference to the FIG. 3.

According to the present invention, the processor 200 determines, from the interference plus noise components measured by the first telecommunication device $20_k$, at most M uplink weighting vectors $g_m$, where m=1 to at most M, to be used for weighting respectively the at most M pilot signals to be transferred to the second telecommunication device 10 and determines at least a power coefficient $\sqrt{\eta}$ to be used for weighting the at most M pilot signals to be transferred to the second telecommunication device 10.

Figure 3:
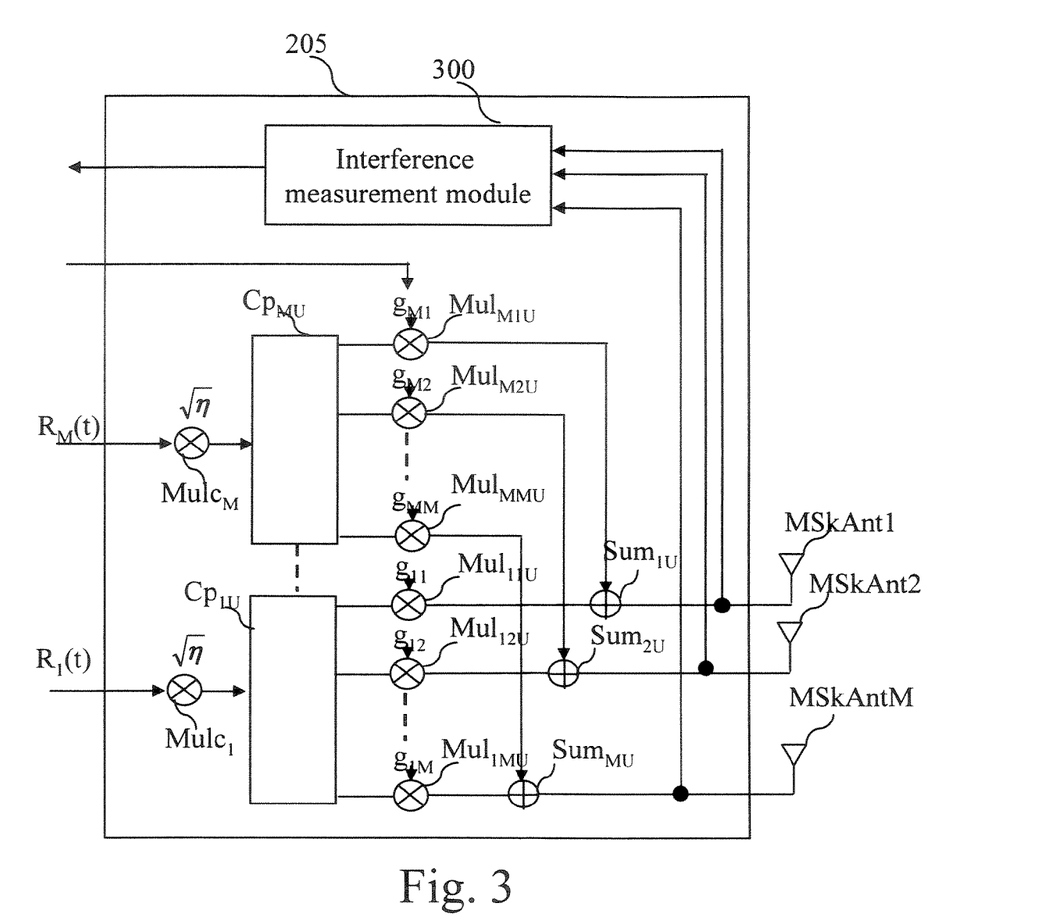
FIG. 3 is a diagram representing the architecture of a channel interface of the first telecommunication device.

FIG. 3 is a diagram representing the architecture of the channel interface of the first telecommunication device.

The channel interface 205 comprises an interference measurement module 300 which measures the interference components received by the first telecommunication device $20_k$.

The interference components are electromagnetic waveforms generated by other first telecommunication devices, electromagnetic waveforms radiated by any electric equipment and/or any other noise received by the first telecommunication device $20_k$.

The second telecommunication device 10 transfers signals representative of $n_{max}$, with $n_{max} \leq N$, groups of data simultaneously using different downlink weighting vectors $w_n = [w_{n1}, \ldots, w_{nN}]^T$, where n=1 to $n_{max}$, $\|w_n\|=1$.

The signals representative of $n_{max}$ groups of data are transferred respectively to $n_{max}$ first telecommunication devices 20 or the signals representative of at least two groups of data are transferred simultaneously to one or several first telecommunication devices 20.

Assuming that the n-th weighted signal $s_n(p)$ received by the first telecommunication device $20_k$ has a power $P_S^{(n)}$ and $(E[|s_n(p)|^2]=1$, the p-th sample $x(p)=[x_1(p), \ldots, x_M(p)]^T$ of the received signal by the first telecommunication device $20_k$ is equal to $$x(p) = \sum_{n=1}^{n_{max}} H w_n \sqrt{P_S^{(n)}} s_n(p) + z_{IN}(p).$$

where $x^T$ denotes the transpose of x, $Z_{IN}(p)=[Z_{IN,1}(p), \ldots, z_{IN,M}(p)]^T$ is the interference plus noise vector of the first telecommunication $20_k$, H is the M*N MIMO channel matrix whose (m,n)-th element is the complex propagation gain between the BSAntn-th antenna of the second telecommunication device 10 and the MSkAntm-th antenna of the first telecommunication device $20_k$.

The interference measurement module 300 measures the interference components received by the first telecommunication device $20_k$ and determines an interference correlation matrix $R_{IN}$ by averaging $z_{IN}(p)z_{IN}^H(p)$ over a large number of samples, where $x^H$ denotes the complex conjugate transpose of x.

Then, $E[z_{IN}(p)z_{IN}^H(p)]=R_{IN}$ where E[x] denotes the mean of x.

The channel interface 205 comprises M means for weighting the pilot signals to be transferred to the second telecommunication device 10 by the power coefficient $\sqrt{\eta}$. The means for weighting the pilot signals, i.e. multiplying the pilot signals to be transferred to the second telecommunication device 10 by the power coefficient $\sqrt{\eta}$ are noted $Mulc_1$ to $MUlc_M$ in the FIG. 3.

The channel interface 205 comprises means for weighting the weighted pilot signals to be transferred to the second telecommunication device 10 by weighting vectors $g_m$. The means for weighting the weighted pilot signals to be transferred to the second telecommunication device 10 are composed of M duplication modules noted $Cp_{1U}$ to $CP_{MU}$, M*M uplink multiplication modules noted $Mul_{11U}$ to $Mul_{MMU}$ M uplink summation modules noted $Sum_{1U}$ to $Sum_{MU}$.

The signals $R_1(t)$ to $R_M(t)$ are the M pilot signals to be transferred to the second telecommunication 10. The signals $R_1(t)$ to $R_M(t)$ are multiplied by the multipliers $Mulc_1$ to $Mulc_M$ by the power coefficient $\sqrt{\eta}$.

The weighted, or multiplied, pilot signals are at most MV times duplicated by a respective duplication module $Cp_{1U}$ to $CP_{MU}$. Each duplicated signal is weighted by the elements of a uplink weighting vector $g_m$ determined by the processor 200. The combination of each signals transferred to the second telecommunication device 10 by the antennas MSkAnt1 to MSAntM is called beamforming signal.

The signals weighted by the first element of each uplink weighting vector $g_m$ are then summed by the adder $Sum_{1U}$ and transferred through the first antenna MSkAnt1 of the first telecommunication device $20_k$. The signals weighted by the second element of each uplink weighting vector $g_m$ are then summed and transferred through the second antenna MSkAnt2 and so on until the M-th elements of the weighting vector $g_m$.

It has to be noted here that the signals are, prior to be transferred to each antenna MSkAnt1 to MSkAntM, frequency up converted, mapped and so on, as it is done in classical wireless telecommunication devices.

It has to be noted here that, less than M pilot signals, as example M' pilot signals with W'≦M, can be transferred to the second telecommunication 10 as it will be disclosed hereinafter. The channel interface 205 comprises M' means for weighting the pilot signals to be transferred to the second telecommunication device 10, the means for weighting the weighted pilot signals to be transferred to the second telecommunication device 10 are composed of M' duplication modules, M*M' uplink multiplication modules and M uplink summation modules.

Figure 4:
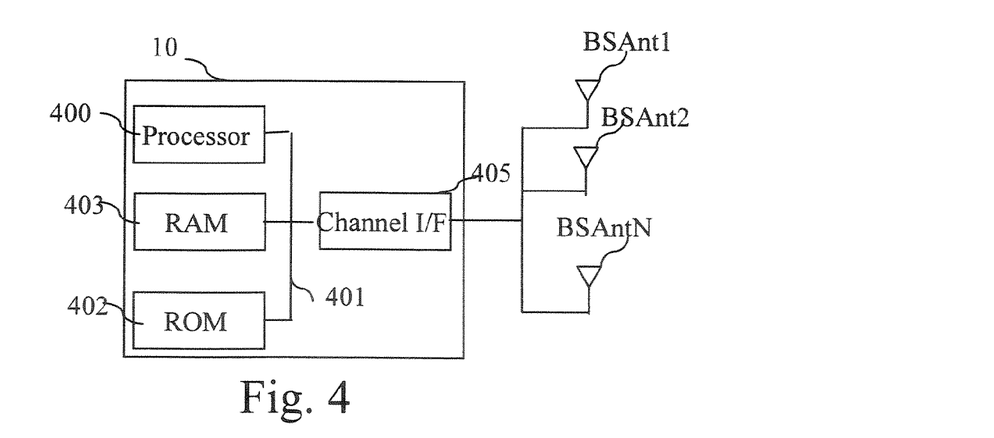
FIG. 4 is a diagram representing the architecture of the second telecommunication device according to the present invention.

FIG. 4 is a diagram representing the architecture of the second telecommunication device according to the present invention.

Figure 7:
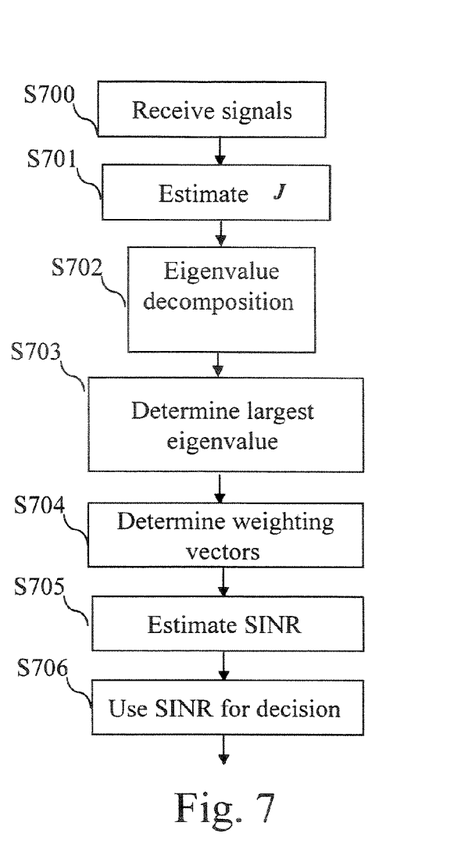
FIG. 7 is an algorithm executed by the second telecommunication device according to the present invention.

The second telecommunication device 10, has, for example, an architecture based on components connected together by a bus 401 and a processor 400 controlled by programs related to the algorithm as disclosed in the FIG. 7.

It has to be noted here that the second telecommunication device 10 is, in a variant, implemented under the form of one or several dedicated integrated circuits which execute the same operations as the one executed by the processor 400 as disclosed hereinafter.

The bus 401 links the processor 400 to a read only memory ROM 402, a random access memory RAM 403 and a channel interface 405.

The read only memory ROM 402 contains instructions of the programs related to the algorithm as disclosed in the FIG. 7 which are transferred, when the second telecommunication 10 is powered onto the random access memory RAM 403.

The RAM memory 403 contains registers intended to receive variables, and the instructions of the programs related to the algorithm as disclosed in the FIG. 7.

According to the present invention, the processor 400 is able to determine, for each first telecommunication device $20_1$ to $20_K$, from at least signals transferred by each first telecommunication device, the downlink weighting vector $w_n$ to be used by the second telecommunication device 10 when it transfers signals to each first telecommunication device $20_1$ to $20_K$. The processor 400 is also able to determine the modulation and coding scheme to be used by each first telecommunication device $20_k$ and/or to determine to which first telecommunication device 20, signals representative of a group of data have to be sent according to signals transferred by the first telecommunication devices 20. The processor 400 is also able to adjust the transmission power by setting at least a predicted SINR to a predetermined SINR.

The channel interface 405 comprises means for receiving weighted pilot signals from each first telecommunication device $20_1$ to $20_K$, means for receiving from each first telecommunication device $20_1$ to $20_K$, a respective power information. The channel interface 405 comprises means for directing, using the downlink weighting vectors $w_n$, the signals representatives of groups of data transferred by the second telecommunication device 10 to each first telecommunication device $20_1$ to $20_K$. The channel interface 405 will be disclosed in more details in reference to the FIG. 5.

Figure 5:
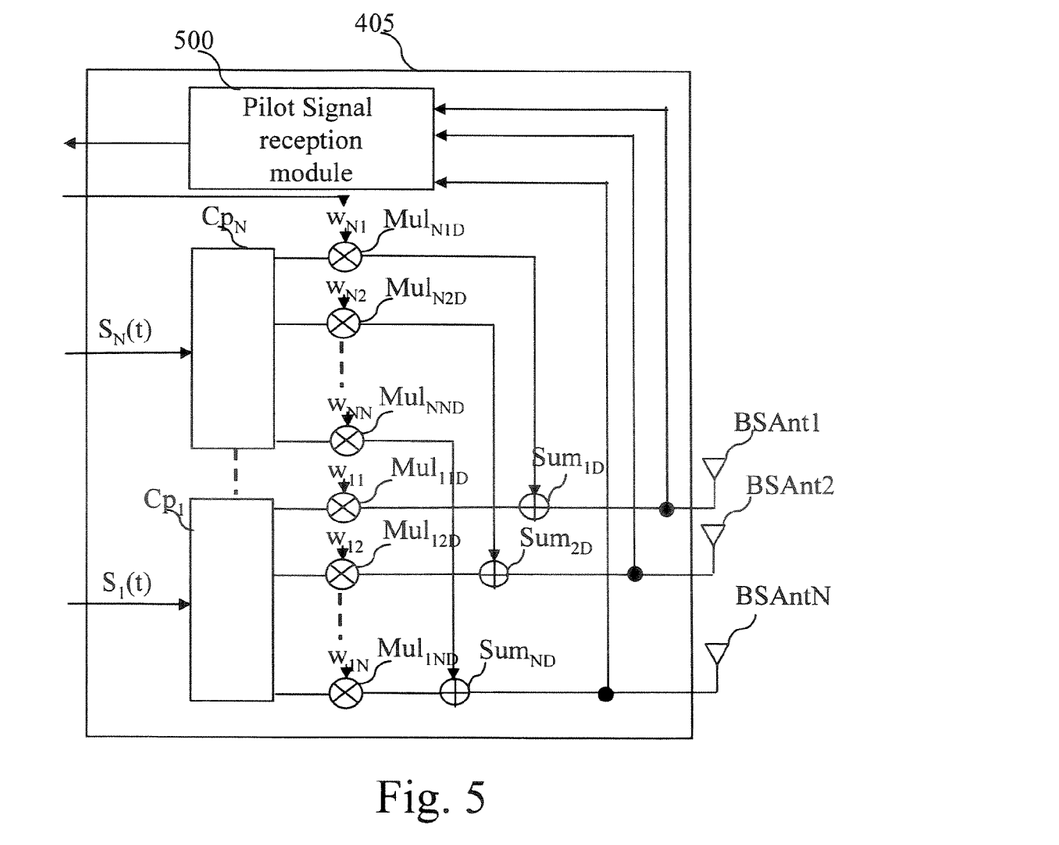
FIG. 5 is a diagram representing the architecture of a channel interface of the second telecommunication device.

FIG. 5 is a diagram representing the architecture of a channel interface of the second telecommunication device.

The channel interface 405 of the second telecommunication device 10 comprises a pilot signal reception module 500, N duplication modules noted $Cp_1$ to $CP_N$, N*N downlink multiplication modules noted $Mul_{11D}$ to $Mul_{NND}$ and at most N downlink summation modules noted $Sum_{1D}$ to $Sum_{ND}$.

The pilot signal reception module 500 comprises means for receiving pilot signals and means for receiving a power information from each of the first telecommunication devices $20_1$ to $20_K$.

The signals $S_1(t)$ to $S_N(t)$ are the signals, which are respectively representative of N groups of data, to be transferred simultaneously to the K terminals $20_1$ to $20_K$ linked to the second telecommunication device 10. Each of the signals $S_1(t)$ to $S_N(t)$ are N times duplicated by a respective duplication module $Cp_1$ to $CP_N$. Each duplicated signal is weighted by the elements of a downlink weighting vector $w_n$ corresponding to the group of data noted n, with n=1 to N, to be transferred to the terminal $20_k$. The combination of the signals transferred to a terminal $20_k$ by the antennas BSAnt1 to BSAntN is called beamforming signal.

The signals weighted by the first element of each downlink weighting vector $w_n$ of the second telecommunication device 10 are summed by the adder $Sum_{1D}$ and transferred through the first antenna BSAnt1 of the second telecommunication device 10. The signals weighted by the second element of each weighting vector $w_n$ are summed and transferred through the second antenna BSAnt2 of the second telecommunication device 10 and so on until the N-th element of each weighting vector $w_n$ of the second telecommunication device 10.

It has to be noted here that the signals are, prior to be transferred to each antenna BSAnt1 to BSAntN, frequency up converted, mapped and so on, as it is done in classical wireless telecommunication devices.

It has to be noted here that, less than N groups of data can be transferred simultaneously, as example N' pilot signals with N'≦N, can be transferred simultaneously. The means for weighting the signals representative of a group of data are composed of N' duplication modules, N*N' uplink multiplication modules and N uplink summation modules.

FIG. 6 is an algorithm executed by the first telecommunication device according to the present invention.

The present algorithm is more precisely executed by each of the first telecommunication devices $20_1$ to $20_K$.

At step S600, the processor 200 of the first telecommunication devices $20_k$ receives, from the interference measurement module 300 of the channel interface 205, the interference correlation matrix $R_{IN}$ of the first telecommunication device $20_k$. The interference correlation matrix $R_{IN}$ is representative of the interference components generated by other first telecommunication devices and/or any other electric devices and/or any other noise received by the first telecommunication device $20_k$.

At next step S601, the processor 200 executes an eigenvalue decomposition of the interference correlation matrix $R_{IN} \cdot R_{IN} = F\Phi F^H$ where $\Phi$ and F are M*M diagonal and unitary matrices and $x^H$ denotes the complex conjugate transpose of the matrix x.

It has to be noted here that the matrix F is representative of the spatial direction of the received noise components and the matrix Φ is proportional to the power of the received interference components.

At next step S602, the processor 200 determines a power coefficient $\sqrt{\eta}$. The power coefficient $\sqrt{\eta}$ can be set to any value or to a predetermined value known by all the communication devices 10 and 20.

In a particular mode of realisation of the present invention, η is equal to $$\eta = P_S \left( \frac{1}{M} tr\{R_{IN}^{-1}\} \right)^{-1},$$

where $P_s$ is a predetermined transmit power per antenna of the first telecommunication device $20_k$ and tr{x} is the trace of the matrix x i.e. the sum of diagonal elements of the matrix x.

At next step S603, the processor 200 calculates the uplink weighting vectors $g_m = [g_{m,1}, \ldots, g_{m,M}]^T$, with in =1 to M, using the following formula:

$G = [g_1, \ldots, g_M] = F^* \Phi^{-1/2}$ where x* denotes the conjugate of x.

At next step S604 the processor 200 transfers the uplink weighting vectors $g_m[g_{m,1}, \ldots, g_{m,M}]^T$, with m=1 to M to the channel interface 205.

In a variant of realisation, if some coefficients of the matrix Φ is lower than a predetermined threshold, the processor 200 doesn't transfer the corresponding uplink weighting vector to the channel interface 205. In such case, a reduced number of pilot signals need then to be transferred to the second telecommunication device 10.

The number of pilot symbols can either be reduced by setting at least one of them to null value.

At step S605, the processor 200 transfers the power coefficient $\sqrt{\eta}$ to the channel interface 205. The power coefficient $\sqrt{\eta}$ is used for weighting the pilot signals to be transferred to the second telecommunication device 10.

At next step S606, the processor 200 transfers at most M pilot signals to the channel interface 205. The pilot signal $r_m(p)$, with m=1 to at most M, transferred from the m-th antenna has $p_0$ symbols which are mutually orthogonal as:

$$\frac{1}{p_0} \sum_{p=1}^{p_0} r_{m1}(p) * r_{m2}(p) = 1 \text{ if } m_1 = m_2$$

and 0 otherwise.

At next step S607, each of the at most M pilot signals are duplicated at most M times. Each duplicated pilot signal is weighted by the elements of an uplink weighting vector $g_m[g_{m,1}, \ldots, g_{m,M}]^T$, with m=1 to at most M, and transferred to the second telecommunication device 10. The power information η related to the power coefficient $\sqrt{\eta}$ is also transferred to the second telecommunication device 10 at the same step. It has to be noted here that, if the power coefficient is equal to the predetermined value, the power information is not transferred.

The power information η represents the multiplying factor used by the first telecommunication device $20_k$ for weighting the pilot signals.

FIG. 7 is an algorithm executed by the second telecommunication device according to the present invention.

The step S700 to S705 are executed in parallel for the pilot signals received from each of the first telecommunication devices $20_1$ to $20_K$.

At step S700, the signals transferred at step S606 by a first telecommunication device 20, are received by the pilot signal reception module 500 of the channel interface 405 of the second telecommunication device 10. The p-th sample noted $x_A(p)$ of the received signal of the of the pilot signals with m=1 to M is expressed as:

$x_A(p) = \sqrt{\eta} H^T Gr(p) + z_A(p)$, wherein $r(p) = [r_1(p), \ldots, r_M(p)]^T$ denotes the pilot signal transferred through all the M antennas of the first telecommunication device $20_k$, $z_A(p) = [Z_{A,1}(p), \ldots, z_{A,N}(p)]^T$ is the second telecommunication device 10 interference plus noise component and H is the downlink MIMO channel matrix. Since the channel is reciprocal in the downlink and uplink channels, the uplink MIMO channel matrix is expressed as $H^T$.

At next step S701, the processor 400 estimates the product of matrices $H^T G$.

The received signals p=1, . . . , $p_0$ are totally expressed in matrix form as:

$X_A = [x_A(1), \ldots, x_A(p_0)] = \sqrt{\eta} H^T GR + Z_A$ $R = [r(1), \ldots, r(p_0)]$ $Z_A = [z_A(1), \ldots, z_A(p_0)]$ where $$\frac{RR^H}{p_0} = I \text{ as } \frac{1}{p_0} \sum_{p=1}^{p_0} r_{m1}(p) * r_{m2}(p) = 1 \text{ if } m_1 = m_2$$

and 0 otherwise. M denotes the m-th pilot signal, 1 and 2 denote consecutive coefficients of the m-th pilot signal.

Then, the processor 400 estimates $H^T G$ as $$J = \frac{1}{\sqrt{\eta} \, p_0} X_A R^H = H^T G + \frac{1}{\sqrt{\eta} \, p_0} Z_A R^H.$$

If $Z_A = 0$ it holds that $J^* J^T = H^H G^* G^T H = H^H R_{IN}^{-1} H$

At next step S702, the processor 400 makes an eigenvalue decomposition of $J^* J^T$.

At next step S703, the processor 400 determines the largest eigenvalue noted $\rho \langle J^* J^T \rangle$ of the matrix $J^* J^T$.

It has to be noted here that, if at least two groups of data have to be transferred in parallel to the first telecommunication device $20_k$ the processor 400 determines the at least two largest eigenvalues of the matrix $J^* J^T$.

At next step S704, the processor 400 determines the downlink weighting vector $w_n$ to be used for transferring signals representative of the n-th group of data to the first telecommunication device $20_k$ which has transferred the signals received at step S700.

If at least two groups of data have to be transferred in parallel to the first telecommunication device, the processor 400 determines at least two downlink weighting vectors to be used for transferring signals representing the at least two groups of data to the first telecommunication device $20_k$ which has transferred the signals received at step S700.

The processor 400 determines the downlink weighting vector $w_n$ as the eigenvector noted $e \langle J^* J^T \rangle$ which corresponds to largest the eigenvalue $\rho\langle J^*J^T\rangle$ or if at least two groups of data have to be transferred in parallel to the first telecommunication device, the processor 400 determines the at least two downlink weighting vectors as the eigenvector which corresponds to largest the at least two eigenvalues.

At next step S705, the processor 400 estimates the Signal-to-Interference-plus-Noise-Ratio (SINR) of the first telecommunication device $20_k$ which has transferred the signals received at step S700.

The SINR $\gamma_n^{(pre)}$ is predicted using the following formula: $\gamma_n^{(pre)} = P_S^{(n)} \cdot \rho_n \langle J^*J^T \rangle$, where n is the indicia related to the group of data to be transferred and $P_S^{(n)}$ is a constant transmission power.

As $$J = \frac{1}{\sqrt{\eta}\, p_0} X_A R^H = H^T G + \frac{1}{\sqrt{\eta}\, p_0} Z_A R^H,$$

the second telecommunication devices 10 uses the power information in order to predict the SINR of the first telecommunication device $20_k$.

It has to be noted here that in a variant of realisation, the second telecommunication device 10 adjusts the transmission power $P_S^{(n)}$ by setting the predicted SINR to a predetermined SINR.

It has also to be noted here that the second telecommunication device 10 can direct the signals transferred to the first telecommunication device $20_k$ which has transferred the signals received at step S700 considering the effect of interferences on the first telecommunication device $20_k$ without having the complete knowledge of H and $R_{IN}$ as it is usually the case in the prior art.

At next step S706, the processor 400 determine the modulation and coding scheme to be used for transferring group of data to the first telecommunication device $20_k$ using the determined SINR or, using the determined SINR of all the first telecommunication devices $20_1$ to $20_K$, the processor 400 determines the first telecommunication device 20 to which, signals representative of a group of data have to be sent.

It has to be noted here that the downlink weighting vector $w_n$ can be obtained without the power information because the fact that the matrix J is multiplied by a coefficient has no effect on $e_n\langle J^*J^T\rangle$.

Figure 8:
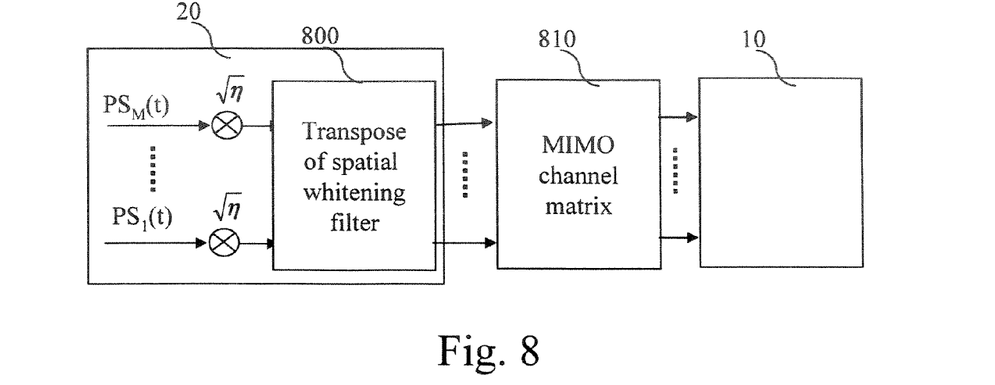
FIG. 8 is a diagram representing a model of the uplink channel considering the interferences components received by a first telecommunication device.

FIG. 8 is a diagram representing a model of the uplink channel considering the interferences components received by a first telecommunication device.

The uplink channel between each first telecommunication device $20_1$ to $20_K$ and the second telecommunication device 10 can be, thanks to the present invention, represented by two matrices 800 and 810.

The coefficients of the matrix 800 are representative of the interference components received by the first telecommunication device $20_k$. The matrix 810 is the classical channel response matrix H of the MIMO system, the coefficient of which are the complex propagation gain between the antennas of the second telecommunication device 10 and the antennas of the first telecommunication device $20_k$.

The matrix 800 is equal to the transpose of a whitening matrix D.

According to the invention, the matrix $D=(F^*\Phi^{-1/2})^T$.

The matrix D corresponds to a spatial whitening matrix which whitens the interference plus noise component $z_{IN}(p)$ of the first telecommunication device $20_k$ as $E[z_{IN}'(p)z_{IN}'(p)^H]=DR_{IN}D^H=I$ with $z_{IN}'(p)=DZ_{IN}(p)$.

Hence, the received signal x(p) after spatial whitening process is expressed as:

$$x(p)' = \sum_{n=1}^{N} DHw_n \sqrt{P_S^{(n)}}\, s_n(p) + z'_{IN}(p)$$

Considering the virtual channel expressed by the product of the matrix D and H, the downlink weighting vector $w_n$, is determined considering the virtual channel DH and spatially whitens interference plus noise component $Z_{IN}'(p)$.

Therefore, the second telecommunication device 10 equivalently determines the downlink weighting vector $w_n$ using the knowledge of the virtual channel DH.

The present invention applies this principle and the first telecommunication device $20_k$ equivalently sends the pilot signals $\sqrt{\eta}\,r(p)$ through the virtual channel.

Then, the signals transferred by first telecommunication device $20_k$ are expressed as $\sqrt{\eta}\,r(p)=Gr(p)$. Since the interference plus noise component is whitened in the virtual channel, it is not necessary to feed back the correlation coefficients of interference plus noise between the antennas of first telecommunication device $20_k$. Consequently, the proposed method doesn't need to feedback any information or needs only to feeds back only the power information related to the power coefficient.

Naturally, many modifications can be made to the embodiments of the invention described above without departing from the scope of the present invention. As example, the second telecommunication device 20 can use N' antennas, with N'<N, instead of N antennas for transferring the signals representative of a least a group of data and/or at least one first telecommunication device 20 can use M' antennas, with M'<M, instead of M antennas for transferring the weighted pilot signals.

The invention claimed is:

1. Method for reporting, through a wireless network, information related to interference components received by a first telecommunication device which comprises M antennas to a second telecommunication device which comprises N antennas, the method comprises the steps executed by the first telecommunication device of:
   measuring the interference components received by the first telecommunication device,
   determining at most M weighting vectors from the measured interference components,
   weighting at most M pilot signals with the at most M determined weighting vectors, and
   transferring the at most M weighted pilot signals to the second telecommunication device.

2. Method according to claim 1, wherein the method comprises a further step of:
   determining at least two matrices from the measured interference components, a first matrix being representative of the spatial direction of the interference components and a second matrix being representative of the power of the noise components and the at most M weighting vectors are determined from the first and second matrices.

3. Method according to claim 2, wherein the first and second matrices are determined by executing an eigenvalue decomposition of an interference correlation matrix $R_{IN}$ obtained from the measured interferences components.

4. Method according to claim 3, wherein the M weighting vectors $g_1$ to $g_m$ are determined according to the following formula:

$G=[g_1, \ldots, g_m]=F^*\Phi^{-1/2}$ where $F^*$ denotes the conjugate of F, F is the first matrix and $\Phi$ is the second matrix.

5. Method according to claim 2, wherein the method further comprises the steps of:
   determining a power coefficient,
   weighting the at most M pilot signals by the power coefficient, and
   transferring to the second telecommunication device signals representing a power information which is related to the determined power coefficient.

6. Computer readable medium having a computer program recorded thereon, the program configured to be executed by a programmable device, the program including instructions for implementing the steps of the method when executed on the programmable device according to any one of claims 1 to 5.

7. Method for controlling the transfer of signals representative of a group of data to a first telecommunication device by a second telecommunication device through a wireless network, the second telecommunication device having N antennas, the first telecommunication device having M antennas, the method comprises the steps executed by the second telecommunication device of:
   receiving at most M pilot signals from the first telecommunication device,
   determining, from the at most M received pilot signals, information representative of interference components received by the first telecommunication device, and
   controlling the transfer of the signals representative of the group of data to the first telecommunication device according to the determined information representative of interference components received by the first telecommunication device.

8. Method according to claim 7, wherein the determined information representative of interference components received by a first telecommunication device is a weighting vector and in that the control of the transfer of signals representative of a group of data to the first telecommunication device is made by weighting the signals representative of a group transferred to the first telecommunication device of data by the weighting vector.

9. Method according to claim 8, wherein the weighting vector is determined by:
   calculating a matrix J from the at most M received pilot signals,
   executing an eigenvalue decomposition of the product of two matrices obtained from the calculated matrix in order to obtain eigenvectors and eigenvalues, and
   selecting the eigenvector corresponding to the largest eigenvalue of the product of the two matrices obtained from the calculated matrix.

10. Method according to claim 9, wherein the product of two matrices obtained from the calculated matrix is equal to $J^*J^T$, where $J^*$ denotes the conjugate of J and $J^T$ denotes the transpose of J.

11. Method according to claim 9, wherein at least two groups of data are transferred simultaneously to the first telecommunication device and in that an eigenvector is selected for each group of data transferred simultaneously, the selected eigenvectors corresponding to the at least two largest eigenvalues of the product of the two matrices obtained from the calculated matrix.

12. Method according to claim 7, wherein the method comprises further step of:
   receiving from the first telecommunication device signals representing a power information and in that the information representative of interference components received by the first telecommunication device is determined from the M received pilot signals and the power information.

13. Method according to claim 12, wherein the control of the transfer of signals representative of a group of data to the first telecommunication device is the determination of the transmission power to be used for transferring at least a group of data to the first telecommunication device.

14. Method according to claim 12, wherein the control of the transfer of signals representative of a group of data to the first telecommunication device is the determination of the modulation and coding scheme to be used for transferring at least signals representative of a group of data to the first telecommunication device.

15. Method according to claim 12, wherein plural first telecommunication devices transfer pilot signals and signals representative of the power information and in that the control of the transfer of signals representative of a group of data to the first telecommunication device is the determination to which first telecommunication device or devices among the plural first telecommunication devices, signals representing at least a group of data have to be transferred.

16. Computer readable medium having a computer program recorded thereon, the program configured to be executed by a programmable device, the program including instructions for implementing the steps of the method when executed on the programmable device according to any one of claims 7 to 15.

17. Device for reporting, through a wireless network, information related to interference components received by a first telecommunication device which comprises M antennas to a second telecommunication device which comprises N antennas, the device for reporting information related to interference components is included in the first telecommunication device and comprises:
   means for measuring the interference components received by the first telecommunication device,
   means for determining at most M weighting vectors from the measured interference components,
   means for weighting at most M pilot signals with the at most M determined weighting vectors, and
   means for transferring the at most M weighted pilot signals to the second telecommunication device.

18. Device for controlling the transfer of signals representative of a group of data to a first telecommunication device by a second telecommunication device through a wireless network, the second telecommunication device having N antennas, the first telecommunication device having M antennas, the device for controlling the transfer of signals is included in the second telecommunication device and comprises:
   means for receiving at most M pilot signals from the first telecommunication device,
   means for determining, from the at most M received pilot signals, information representative of interference components received by the first telecommunication device,
   means for controlling the transfer of the signals representative of the group of data to the first telecommunication device according to the determined information representative of interference components received by the first telecommunication device.

* * * * *